United States Patent [19]

Terada et al.

[11] Patent Number: 5,613,792
[45] Date of Patent: Mar. 25, 1997

[54] BALL JOINT

[75] Inventors: Makoto Terada, Fukuroi; Teiji Suka; Hiroyuki Nakaya, both of Utsunomiya, all of Japan

[73] Assignees: Showa Corporation, Gyoda; Nifco Inc., Yokohama, both of Japan

[21] Appl. No.: 473,210

[22] Filed: Jun. 7, 1995

[30] Foreign Application Priority Data

Jun. 29, 1994 [JP] Japan ................................ 6-168593

[51] Int. Cl.$^6$ .................................................. F16C 11/00
[52] U.S. Cl. ........................... 403/131; 403/133; 403/135; 403/141
[58] Field of Search ............................... 403/75, 76, 122, 403/131, 133, 135, 141, 143

[56] References Cited

U.S. PATENT DOCUMENTS

| | | | |
|---|---|---|---|
| 1,153,789 | 9/1915 | Hopkins | 403/122 X |
| 1,559,402 | 10/1925 | Boardman | 403/76 |
| 2,005,948 | 6/1935 | Mitchell | 403/143 X |
| 2,202,276 | 5/1940 | Venditty | 403/75 |
| 2,530,554 | 11/1950 | Tinnerman | 403/122 |
| 2,589,820 | 3/1952 | Konchan | 403/75 |
| 2,766,079 | 10/1956 | Browne | 403/131 X |
| 4,225,261 | 9/1980 | Marx | 403/122 |
| 4,367,968 | 1/1983 | Ishida | 403/122 |
| 4,679,958 | 7/1987 | Mizusawa et al. | 403/143 |
| 4,776,720 | 10/1988 | Nolen | 403/143 X |
| 5,011,321 | 4/1991 | Kidokoro | 403/122 X |
| 5,109,321 | 4/1992 | Maglica et al. | 403/122 X |

FOREIGN PATENT DOCUMENTS

| | | | |
|---|---|---|---|
| 59-69518 | 4/1984 | Japan . | |
| 60-9450 | 4/1985 | Japan . | |
| 167160 | 5/1959 | Sweden | 403/141 |
| 1001469 | 8/1965 | United Kingdom | 403/122 |
| 2123479 | 2/1984 | United Kingdom . | |
| 2196690 | 5/1988 | United Kingdom | 403/122 |

*Primary Examiner*—Blair Johnson
*Assistant Examiner*—Andrea Chop
*Attorney, Agent, or Firm*—Oblon, Spivak, McClelland, Maier & Neustadt, P.C.

[57] ABSTRACT

A ball joint includes a socket of synthetic resin having a through-hole that accommodates a ball, a hole into which a rod is inserted and which is formed at right-angles to the through-hole and an accommodation portion that communicates with the rod insertion hole, a ball stud, the ball of which is accommodated in the through-hole, a C-ring mounted in the socket through-hole to maintain the ball in place, a cap that closes the open end of the socket and has a holder portion that locates in the accommodation portion of the socket and which holds the end of the inserted rod.

5 Claims, 6 Drawing Sheets

BALL JOINT

BACKGROUND OF THE INVENTION

1. Field of the Invention

The present invention relates to a ball joint in which a rod is affixed in a socket of synthetic resin, the ball of the ball stud is maintained so that it cannot come out of the socket and the ball stud can be freely swung relative to the socket.

2. Description of the Prior Art

There have been examples of ball joints such as the one described by Japanese Patent Publication No. 60-9450, which comprises a rod having an annular groove at one end; a stud having a ball on one end; a socket of synthetic resin in which the ball stud is swingably affixed, the socket having an annular groove provided on the inside surface of a hole into which an end of the rod is inserted, the groove tapering outward in the direction in which the rod is inserted; and a ring which fits into the groove in the socket and engages with the groove in the rod to prevent the rod being withdrawn from the hole. In the ball joint thus configured, the ring is contracted to insert it into position in the groove of the socket, and the end of the rod is then inserted into the rod hole in the socket, which expands the ring and allows the insertion of the rod into the hole. Once the rod has been inserted, the resilience of the ring causes it to snap into engagement with the groove on the rod, thereby maintaining the rod so it does not come back out of the socket.

Another example of a ball joint that is known, described in JP-A-59-69518, is comprised of a rod having a male thread on one end, a ball stud, and a synthetic resin socket in which the ball stud is swingably affixed and which has a rod fixing hole the inside surface of which is provided with a female thread for engagement with the male thread of the rod. In this ball joint arrangement the rod is affixed to the socket by the screwed engagement of the male thread of the rod with the female thread of the socket.

With the former ball joint arrangement, the annular groove has to be formed by undercutting the inside surface of the hole into which the rod is inserted. This presents a problem, as it is difficult to form the socket and the undercut portion. A problem with the latter ball joint arrangement is the screw engagement of the rod with the socket, which makes assembly a time-consuming process and requires the use of a complex mold, increasing the cost. In addition, because rotation of the rod could cause the rod to become unscrewed and disengage from the socket, some means of preventing this has to be used, such as using adhesive to bond the rod and socket together, for example.

An object of the present invention is to provide a ball joint having a straightforward structure, in which the socket can be readily formed and the operation of affixing the rod in the socket can readily be accomplished.

SUMMARY OF THE INVENTION

For achieving the aforesaid object, the ball joint according to this invention comprises a socket of synthetic resin having a through-hole that accommodates a ball, a hole into which a rod is inserted, said rod insertion hole being formed at right-angles to the through-hole, and an accommodation portion that communicates with the insertion hole, a ball stud having at one end a ball that is accommodated in the through-hole of the socket, a C-ring that is mounted in the socket through-hole to maintain the ball inserted in the through-hole, a rod that is inserted into the rod insertion hole in the socket, and a cap that closes an open end of the socket through-hole on a side opposite a side where the ball is inserted, said cap having a holder portion that is accommodated in the accommodation portion of the socket and holds an end of the rod inserted into the rod insertion hole.

Thus, the above-described ball joint according to the present invention has a socket with an accommodation portion that communicates with the rod insertion hole and a cap having a holder portion that is accommodated in the socket accommodation portion and holds the end of the rod inserted into the rod hole, thereby enabling the rod inserted into the rod opening to be secured in the socket with a single operation. In addition, a groove is provided around the end portion of the rod in which a forked engagement member on the cap holder portion engages, thereby further strengthening the attachment of the rod in the socket.

The above and other features of the present invention will become apparent from the following description made with reference to the drawings.

DESCRIPTION OF THE PREFERRED EMBODIMENTS

Figure 1:
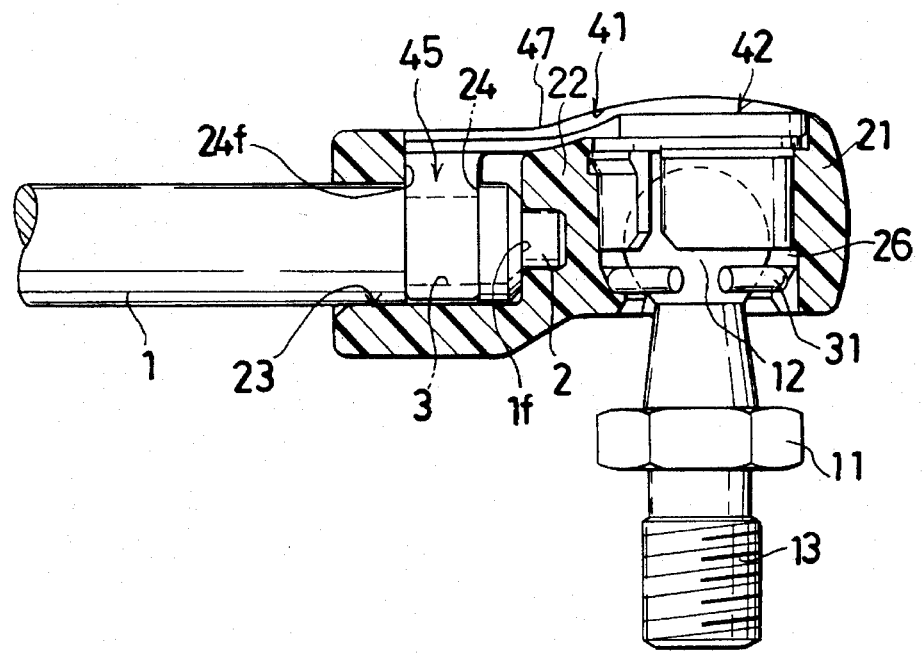
FIG. 1 is a partial cross-sectional view of an assembled ball joint according to a first embodiment of the invention.

FIGS. 1 to 10 illustrate a first embodiment of the ball joint according to this invention. In the drawings, reference numeral 1 denotes a round rod formed of metal, an end of which is provided with a concentric, smaller-diameter projection 2. An annular groove 3 is provided on the end portion of the rod 1, near the projection 2. Numeral 1f denotes an abutment face of the rod 1 formed by the end face on which the projection 2 is provided.

Reference number 11 denotes a ball stud formed of metal. One end of the ball stud 11 is provided with a ball 12, and the other end with a male thread 13. 21 denotes a socket formed of synthetic resin. The socket 21 has a through-hole 26 in which the ball 12 is accommodated, a hole 23 into which the end portion of the rod 1 is inserted, said hole 23 being arranged at right-angles to the through-hole 26, and an accommodation portion 24 in which a holder portion 45 of a cap 41, described below, is accommodated. Reference number 24f is a surface that the holder portion 45 contacts when it is inserted into the accommodation portion 24, thereby controlling the position of the holder portion 45 against the tension imposed by the rod 1, when a connecting portion 47, described below, is formed of a soft material or is thin and therefore is not strong enough.

Reference number 31 is a metal C-ring that is mounted inside the through-hole 26 to retain the inserted ball 12 in the through-hole 26. The inside diameter of the C-ring 31 is smaller than the diameter of the ball 12. The cap 41 is integrally comprised of a cap portion 42 that closes the open end of the through-hole 26 on the opposite side from where the ball 12 is inserted, and the holder portion 45 that is located in the portion 24 and secures the rod 1 against withdrawal from the hole 23.

Figure 2:
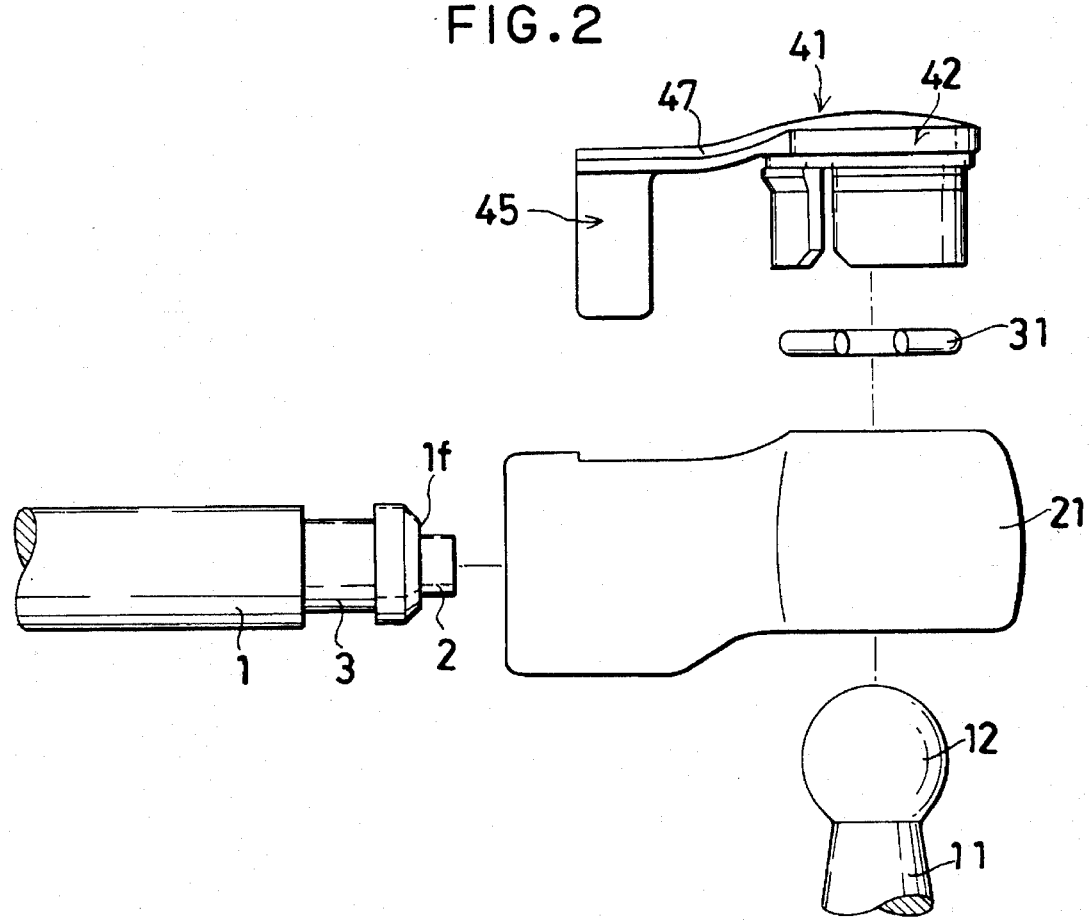
FIG. 2 is a side view showing the ball joint of FIG. 1 in a disassembled state.
Figure 3:
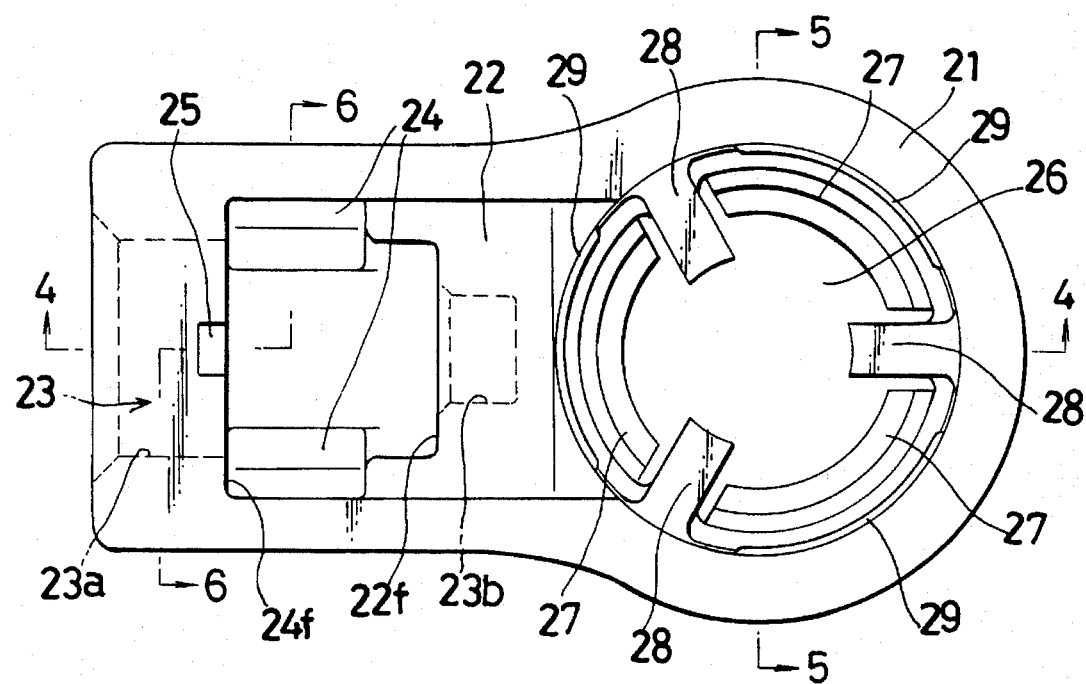
FIG. 3 is an enlarged plan view of the socket of the ball joint of FIG. 1.
Figure 4:
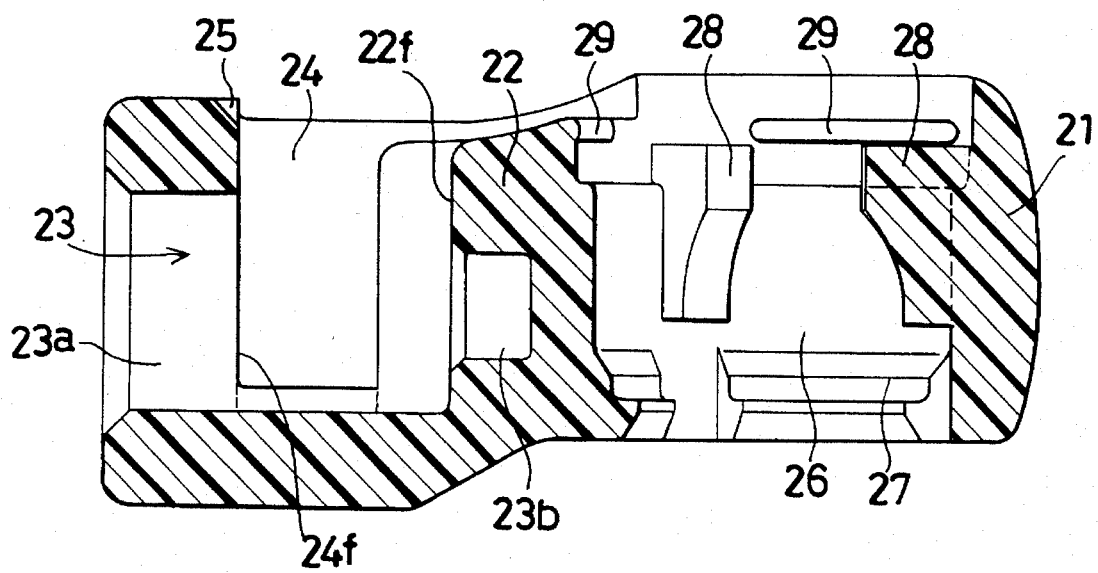
FIG. 4 is a cross-sectional view through line 4—4 of FIG. 3.
Figure 5:
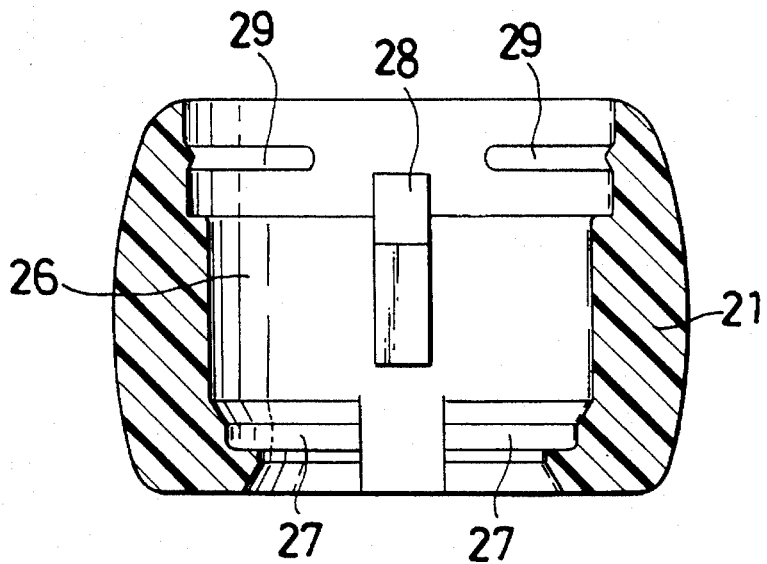
FIG. 5 is a cross-sectional view through line 5—5 of FIG. 3.
Figure 6:
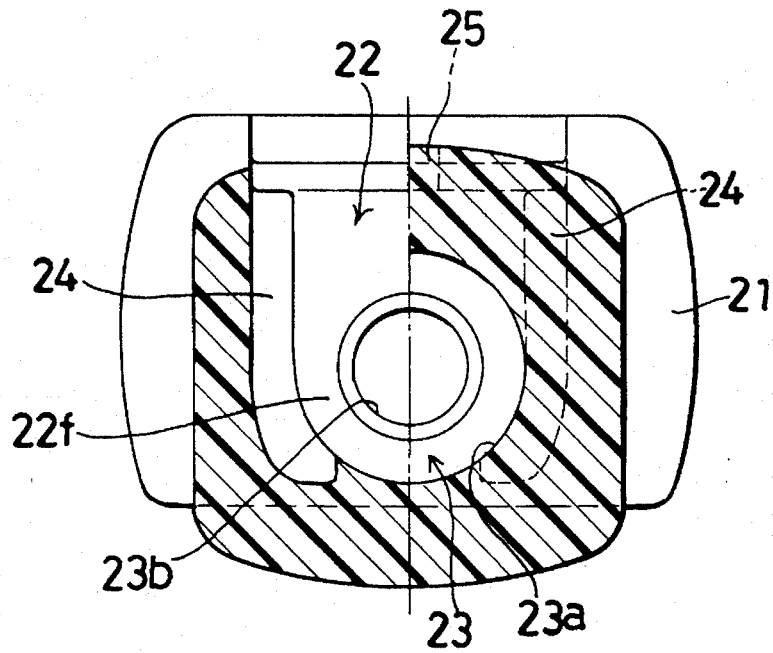
FIG. 6 is a cross-sectional view through line 6—6 of FIG. 3.

FIG. 3 is an enlarged plan view of the socket shown in FIGS. 1 and 2, FIG. 4 is a sectional view through line 4—4 of FIG. 3, FIG. 5 is a sectional view through line 5—5 of FIG. 3, and FIG. 6 is a sectional view through line 6—6 of FIG. 3. In these drawings, 22 indicates a contact wall separating the rod insertion hole 23 from the through-hole 26, and 22f is a positioning surface, formed by the surface on the rod insertion hole 23 side, against which face 1f abuts. The rod insertion hole 23 consists of a round hole 23a that extends from the left end (with reference to the drawing) of the socket 21 to the contact wall 22 and has a slightly larger diameter than that of the rod 1, and a small hole 23b that is formed in the contact wall 22 in front of the end of the hole 23a with a slightly larger diameter than that of the projection 2.

The accommodation portion 24 extends down on each side of the groove 3 hole 23a and is in communication with the hole 23a. A portion of the hole 23a is open toward the upper part of the socket 21. The end face on the rod insertion hole 23 side forms a surface 24f against which the holder portion 45 slides. The lower ends of the accommodation portion 24 contract perpendicularly with respect to the rod insertion hole 23. Reference number 25 denotes a cavity that slopes to allow communication with the accommodation portion 24.

The through-hole 26 is vertically arranged on the right side of the socket 21. The lower end of the through-hole 26 has a diameter that is slightly larger than that of the ball 12, narrowing to less than the outside diameter of the ring 31 and widening upward to permit adequate expansion of the ring 31 by the insertion of the ball 12. A stepped portion 27 that expands upward is provided at the part where the through-hole 26 diameter increases to maintain the ring 31 in place. Reference number 28 denotes vertical ribs that jut inward in the through-hole 26. The lower part of each rib is formed into a curve that corresponds to the curvature of the upper hemisphere of the ball 12 against which those portions of the ribs are in contact. The ribs 28 have the function of positioning the ring 31 in the through-hole 26 and of acting as a stop for the ring 31, thereby facilitating the insertion of the ball 12. Located horizontally above the ribs 28 are small projections 29 that protrude inwards on the through-hole 26.

Figure 7:
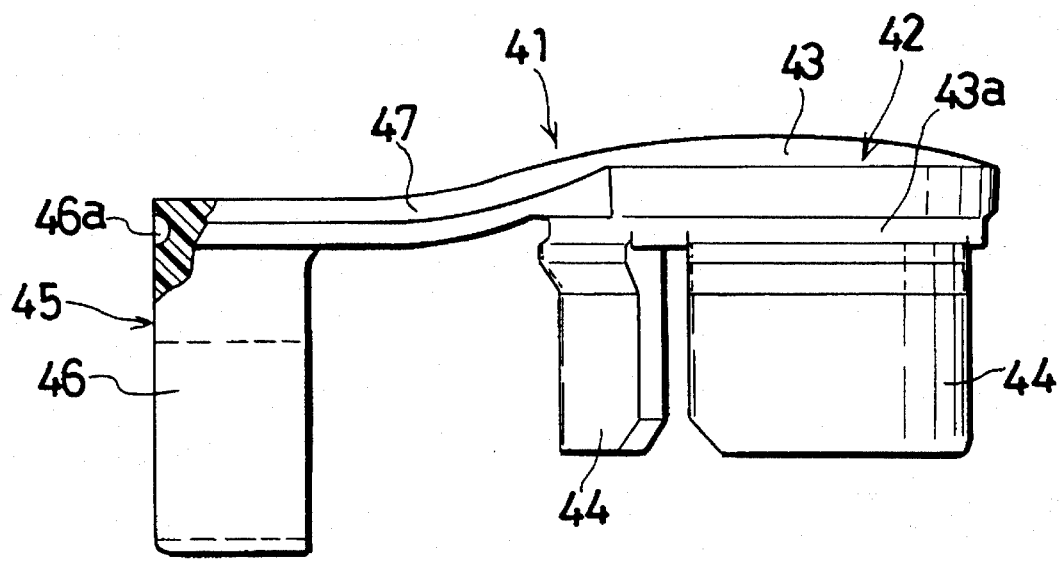
FIG. 7 is an enlarged side view of the cap of the ball joint of FIG. 1, shown partly cutaway.
Figure 8:
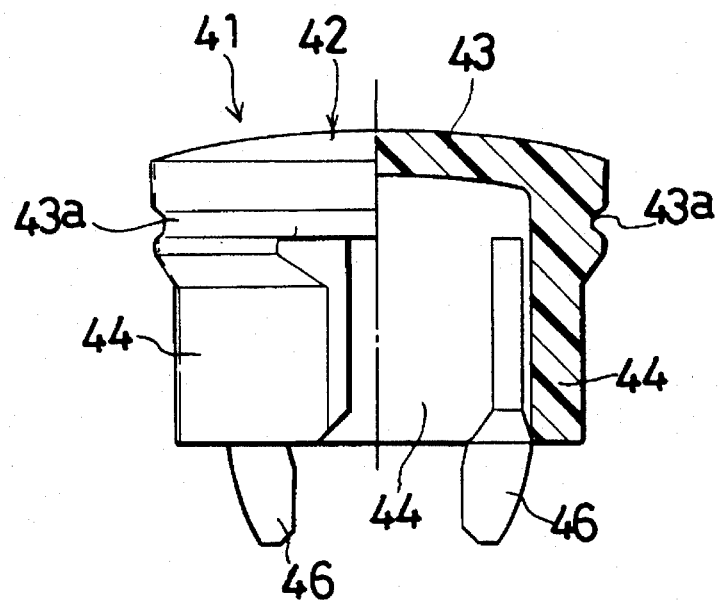
FIG. 8 is a view of the cap of FIG. 7, seen from the right side, with the right half shown cutaway.
Figure 9:
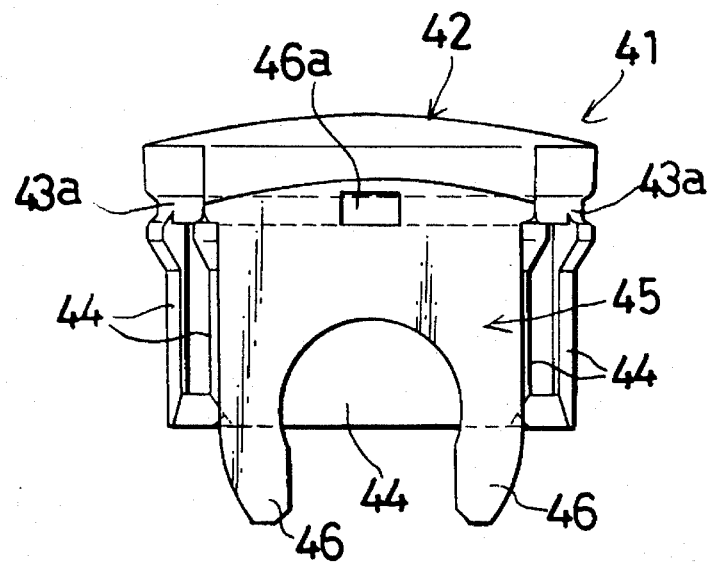
FIG. 9 is a view of the cap of FIG. 7, shown from the left side.
Figure 10:
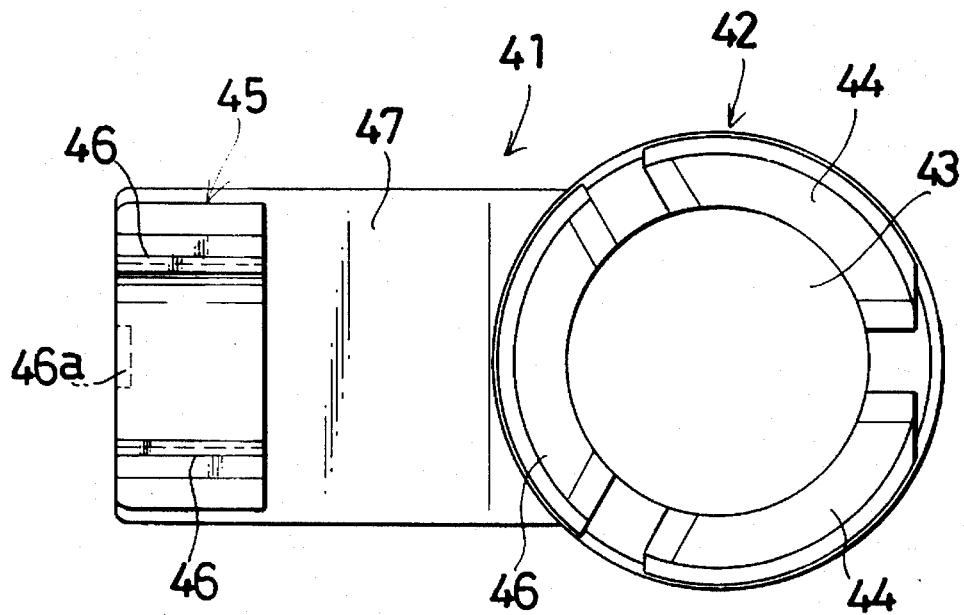
FIG. 10 is an enlarged view of the base of the cap of FIG. 7.

FIG. 7 is an enlarged side view of the cap of the ball joint of FIGS. 1 and 2, shown partly in cutaway, FIG. 8 is a view of the cap of FIG. 7, seen from the right side, with the right half shown in cutaway, FIG. 9 is a left-side view of the cap of FIG. 7, and FIG. 10 is an enlarged view of the base of the cap. With reference to these drawings, the cap 41 is constituted by a cap portion 42 that closes the through-hole 26, a holder portion 45, and a connecting portion 47 between the cap 41 and the holder portion 45.

The cap 41 is comprised of a top 43 that closes the open end of the through-hole 26, and a sleeve 44 that extends downward into the through-hole 26 from the top 43 as a plurality of split pieces, with the diameter of the split sleeve 44 being slightly larger than that of the ball 12. Provided around the periphery of the top 43 is a recess 43a in which the projections 29 engage. The holder portion 45 is inserted down into the accommodation portion 24, acting as a cover that closes the accommodation portion 24, and is comprised of a forked engagement member 46 that holds the rod 1 at the groove 3 section.

The width of the forked engagement member 46 (the length along the axis of the rod insertion hole 23) is slightly less than the width of the groove 3 (the length of along the axis of the rod 1), the inside dimension of the open end of the forked engagement member 46 is less than the diameter of the groove 3, and the outside dimension of the forked engagement member 46 is less than the length of the accommodation portion 24 perpendicular to the rod insertion hole 23. Formed in the edge of the forked engagement member 46 is a recess 46a in communication with the cavity 25. The recess 46a and cavity 25 are provided for the insertion of a tool or the like for disassembling an assembled holder portion 45.

The assembly process will now be described. First, the ring 31 is compressed and fitted inside the through-hole 26. Once in place, the ring 31 is allowed to expand by its own resilience, thereby maintaining it securely in the through-hole 26. The ball 12 of the ball stud 11 is then pressed into the through-hole 26 from the lower end of the socket 21, that is, from the narrow diameter side. The ring 31 braced against the lower ends of the ribs 28 is expanded by the insertion of the ball 12, allowing the ball 12 to pass through the ring 31 and the upper part of the ball 12 to locate against the lower part of the ribs 28. Once the ball has passed through the ring, the ring contract under its own resilience. Thus, even if the ball stud 11 is pulled as if to extract the ball 12 from the through-hole 26, the contact of the ring 31 against the stepped portion 27 prevents the ball 12 being withdrawn from the through-hole 26.

With the ball 12 held thus, the end of the rod 1 having the groove 3 is pushed into the rod insertion hole 23, bringing the projection 2 into the hole 23b and the rod abutment face 1f into contact with the positioning surface 22f, and positioning the groove 3 at the accommodation portion 24. The cap 41 is placed into position by pressing it down onto the socket 21, causing the end of the forked engagement member 46 on the rod insertion hole 23 side to slide along the accommodation portion 24 contact surface 24f. The ends of the forked engagement member 46 descending into the accommodation portion 24 contact, and are opened by, the groove 3 portion of the rod 1, and once past the groove 3 portion contract under their own resilience. As a result, the rod 1 is held in the rod insertion hole 23 by the engagement of the forked engagement member 46 in the groove 3. As the split sleeve 44 is lowered into the through-hole 26, the sections of the sleeve 44 come down between the ribs 28 and hold the ball 12 around its periphery. This brings the projections 29 into engagement with the recess 43a, which prevents the withdrawal of the cap 41 and closes the accommodation portion 24 and the through-hole 26.

As described above, in accordance with the first embodiment of this invention the cap 41 that closes the through-hole 26 and the holder portion 45 that closes the accommodation portion 24 are integrated into a single component by the connecting portion 47. This enables the rod 1 to be held securely by a structure that is simple and does not raise the part count. Also, using the forked engagement member 46 to constitute the holder portion 45 that engages with the groove 3 to hold the rod 1 enables the rod 1 to be secured against withdrawal by the easy and straightforward operation of inserting the forked engagement member 46 into the accommodation portion 24.

Moreover, the contact of the end of the forked engagement member 46 on the rod insertion hole 23 side with the surface 24f of the accommodation portion 24 controls axial movement and prevents withdrawal of the rod 1. In addition, the open end of the forked engagement member 46 has an inside dimension that is smaller than the diameter of the groove 3, thereby ensuring the rod 1 can be strongly maintained against withdrawal. Furthermore, by providing the contact wall 22 so that when the end of the rod 1 is in contact with the wall 22 the groove 3 is located at the accommodation portion 24, the rod 1 can readily be held securely against withdrawal by the simple operation of inserting the rod 1 in the rod insertion hole 23 and affixing the cap 41 to the socket 21.

Figure 11:
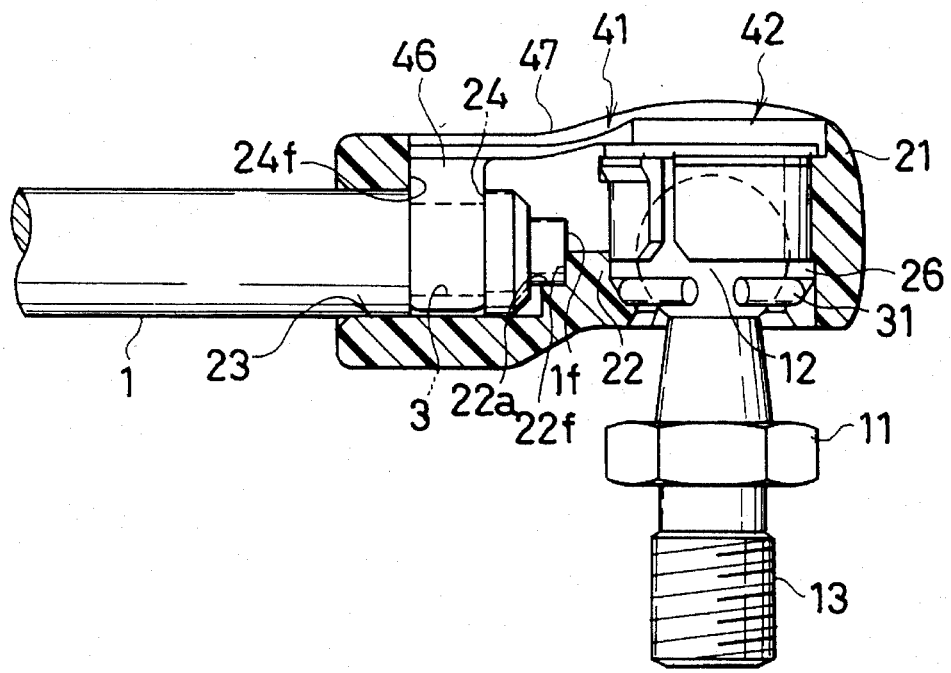
FIG. 11 is a partial cross-sectional view of an assembled ball joint according to a second embodiment of the invention.

FIG. 11 is a partial cross-sectional view of an assembled ball joint according to a second embodiment of the invention. Pans that are the same as parts in FIGS. 1 to 10 have been given the same reference numerals, and further explanation thereof is omitted.

The difference between the ball joint of the second embodiment and that of the first is that the rod abutment face 1f is constituted by the end face of the projection 2 and the upper part of the contact wall 22, from the center of the hole 23b, has been eliminated, so that the positioning surface 22f is formed by the wall of a recess 22a (the wall of the recess 22a located in the axial direction of the rod 1).

The same effect obtained with the first embodiment is obtained with the second embodiment. The reduced volume of the contact wall 22 means that the amount of synthetic resin required to form the socket 21 is also decreased, making it possible to manufacture the socket 21 at a lower cost.

Figure 12:
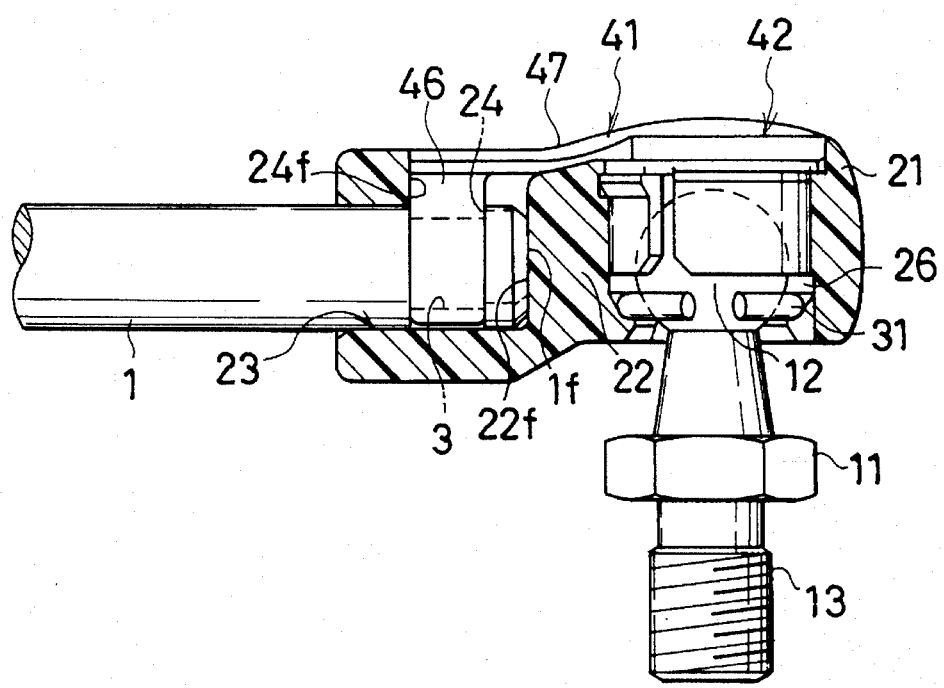
FIG. 12 is a partial cross-sectional view of an assembled ball joint according to a third embodiment of the invention.

FIG. 12 is a partial cross-sectional view of an assembled ball joint according to a third embodiment of the invention. Parts corresponding to parts shown in FIGS. 1 to 10 have been given the same reference numerals, and further explanation thereof is omitted.

The third and first embodiments differ in that in the third embodiment the rod 1 has no projection 2 and there is no hole 23b in the contact wall 22, so the rod insertion hole 23 is formed of just the hole 23a. The same effect obtained with the first embodiment can be obtained with the third embodiment. Also, as there is no projection 2 the rod 1 is easier to machine, involving fewer process steps, enabling the rod 1 to be made at a low cost. Moreover, as the hole 23b is not necessary, a less complex mold can be used to form the socket 21.

In each of the above embodiments the inside dimension of the open end of the holder portion 45 has been made smaller than the diameter of the groove 3 and the cap 41 is secured in place by the engagement of the small projections 29 in the recess 43a. However, even without the projections 29 and recess 43a, the cap 41 can be retained securely in position by the hold of the forked engagement member 46 on the groove 3 of the rod 1. While the above description has been made with reference to an arrangement in which the inside dimension of the open end of the holder portion 45 is smaller than the diameter of the of groove 3, as long as engagement with the groove 3 can be enabled the inside dimension of the holder portion 45 may be larger than the groove 3.

Furthermore, while in the foregoing embodiments the holder portion 45 is described as being constituted as a forked engagement member 46. However, the rod 1 can be held by the socket 21 and holder portion 45 by a broader range of arrangements that do not cause an increase in the part count and enable less complex molds to be used. For example, the part in opposition to the holder portion 45 can be provided with a female thread, the holder portion 45 can be provided with a female thread, and so forth. With respect to the arrangement of the first embodiment, forming the hole 23b in communication with the through-hole 26, removing the upper part of the hole 23b and forming a U-shaped channel in the contact wall 22 reduces the amount of synthetic resin needed to form the socket 21, thus making it possible to manufacture the socket 21 at low cost.

As has been described in the foregoing, as in the ball joint according to this invention the rod is held by a holder portion comprised by the socket and a cap, the range of methods used to hold the rod can be expanded without raising the part count by, for example, providing the part in opposition to the holder portion and the holder portion itself with a female thread, which also simplifies the forming molds used. Also, a forked engagement member is used to comprise the holder portion that engages with a groove on the rod to hold the rod, enabling the rod to be secured against withdrawal by the easy and straightforward operation of inserting the forked engagement member into an accommodation portion in the socket.

In addition, the open end of the forked engagement member has been given an inside dimension that is smaller than the diameter of the groove on the rod, which ensures the rod is securely maintained against withdrawal, and as this arrangement also maintains the cap against withdrawal, it is not necessary to use a configuration in which the cap portion that closes the open end of the through-hole engages with the socket. Moreover, with the provision of the wall against which the rod end abuts, the groove is positioned opposite the holder portion and engagement members, and the operation of securely affixing the rod in the socket against withdrawal can thus be readily accomplished.

What is claimed is:

1. A ball joint, comprising:

a socket of synthetic resin having a through-hole that accommodates a ball, a hole into which a rod is inserted, said rod insertion hole being formed at a right-angle to the through-hole, and an accommodation portion that communicates with the rod insertion hole, said socket being provided on an inside wall thereof defining the through-hole with a plurality of ribs that jut inward in the through-hole;

a ball stud having at one end a ball that is accommodated in the through-hole of the socket;

a C-ring that is mounted in the socket through-hole and maintains the ball inserted in the through-hole;

a rod that is inserted in the rod insertion hole in the socket; and a cap of synthetic resin that closes an open end of the socket through-hole on a side opposite a side where the ball is inserted, said cap having a holder portion that is accommodated in the accommodation portion of the socket and holds an end of the rod inserted into the rod insertion hole.

2. A ball joint according to claim 1, wherein the end of the rod inserted in the hole has an annular groove and the holder portion of the cap comprises a forked engagement member that engages with the annular groove.

3. A ball joint according to claim 2, wherein an inside dimension of an open end of the forked engagement member is smaller than an outside diameter of the annular groove of the rod.

4. A ball joint according to claim 2, wherein the socket has a wall between the through-hole and the accommodation portion against which the end of the rod abuts.

5. A ball joint according to claim 1, wherein the socket has a wall between the through-hole and the accommodation portion against which the end of the rod abuts.

* * * * *